United States Patent [19]

Carr, Jr. et al.

[11] Patent Number: 4,717,873
[45] Date of Patent: Jan. 5, 1988

[54] MAGNETIC DISPLACEMENT TRANSDUCER SYSTEM HAVING A MAGNET THAT IS MOVABLE IN A TUBE WHOSE INTERIOR IS EXPOSED TO A FLUID AND HAVING AT LEAST ONE MAGNETOMETER OUTSIDE THE TUBE

[75] Inventors: Walter J. Carr, Jr., Wilkins Township, Allegheny County; Robert C. Miller, Penn Hills; John B. Lipchak, Forest Hills; Thomas P. Weldon, Pleasant Hills, all of Pa.

[73] Assignee: Westinghouse Electric Corp., Pittsburgh, Pa.

[21] Appl. No.: 797,332

[22] Filed: Nov. 12, 1985

[51] Int. Cl.⁴ .................. G01L 9/14; G01B 7/14; G21C 17/00; G01R 33/04
[52] U.S. Cl. .................. 324/207; 73/722; 324/254; 340/870.33; 376/247
[58] Field of Search ........ 324/207, 208, 249, 253–255; 340/870.31, 870.33, 870.35, 870.36; 318/653, 656; 73/722; 376/247

[56] References Cited

U.S. PATENT DOCUMENTS

| | | | |
|---|---|---|---|
| 2,340,609 | 2/1944 | Mestas | 324/208 X |
| 2,426,622 | 9/1947 | Laird et al. | 324/253 X |
| 2,564,221 | 8/1951 | Hornfeck | 324/208 X |
| 2,755,434 | 7/1956 | Yetter | 324/253 |
| 3,012,177 | 12/1961 | Mortimer | 324/249 X |
| 3,153,935 | 10/1964 | Karlson | 73/722 |
| 3,286,169 | 11/1966 | Slonczewski | 324/254 |
| 3,694,740 | 9/1972 | Bergstrand | 324/235 X |
| 4,107,604 | 8/1978 | Bernier | 324/208 |
| 4,471,304 | 9/1984 | Wolf | 324/208 |
| 4,525,670 | 6/1985 | Miyagawa et al. | 324/208 |

OTHER PUBLICATIONS

Walter J. Carr, "A New D-C. Permeameter," Special Technical Pub. No. 85 of the American Society for Testing Materials, pp. 63–81 (1949).
"Meriam Bellows D/P Unit," two pages.
"Linear Position Transducer Changes Phase Instead of Amplitude," Design News, pp. 180–181, (Nov. 5th, 1984).
"Farrand Inductosyn Rotary and Linear Position Transducers," 2 pages.
W. Lord et al, "Magnetic Flux Leakage for Measurement of Crevice Gap Clearance and Tube Support Plate Inspection," Colorado State University (1983).
"Ceramic Magnetics Series 33 Linear Position Sensor," 2 pages.
U.S. Ser. No. 398,499, filed 7/1982, Frank W. Heemstra.

Primary Examiner—Gerard R. Strecker
Attorney, Agent, or Firm—Daniel C. Abeles

[57] ABSTRACT

A magnetic displacement transducer system for measuring the movement of a member includes an elongated permanent magnet which is mechanically coupled to the member so that the magnet moves parallel to its axis. A magnet-position sensor assembly, which includes at least one magnetometer having an elongated ferromagnetic core with a coil wrapped around it, is positioned adjacent the magnet so that the axis of the core and coil intersects the axis of the magnet at right angles. A pair of wires carry a sinusoidal excitation current to the assembly, convey the second harmonic from the assembly, and deliver a DC biasing current to the assembly in order to null the component of the permanent magnet's field that is perpendicular to the axis of the magnet. The value of the DC biasing current is measured to obtain the displacement of the member. The transducer may be employed in a differential pressure gauge for use within the containment building of a nuclear power plant, in which case it is desirable to know the temperature at the gauge. The same pair of wires that conduct the excitation current, the second harmonic, and the DC biasing current may be used to measure the DC resistance provided by the coils in the assembly so that the temperature can be determined based upon the thermal coefficient of resistance.

14 Claims, 5 Drawing Figures

MAGNETIC DISPLACEMENT TRANSDUCER SYSTEM HAVING A MAGNET THAT IS MOVABLE IN A TUBE WHOSE INTERIOR IS EXPOSED TO A FLUID AND HAVING AT LEAST ONE MAGNETOMETER OUTSIDE THE TUBE

BACKGROUND OF THE INVENTION

The present invention relates to a system which includes a permanent magnet displacement transducer, and more particulary to a transducer wherein a permanent magnet is coupled to a movable member such as a diaphragm that is responsive to pressure or differential pressure, etc. The system of the present invention is particularly useful in hostile environments.

Measurements in hostile environments typically are limited by the environmental effects on sensors and transmission systems.

Reliability of these measurements requires substantial margins against potential failures to achieve desired dependability goals. The high costs of programs to provide statistical substantiation of reliability objectives in these severe environments favors the use of a minimum number of components and materials such that existing experience data bases can substantiate reliability goals and margins in design.

A very limited experience data base exists in the area of materials and components subject to combined effects of temperature, chemistry and (nuclear) radiation [synergistic effects]. A combination of radiation and "high" temperatures have "annealing" effects on some materials. No such benefits exist with radiation at low temperatures. As a result performance predictions by analysis are suspect except where significant margins are known to exist. Further, the substantiation of reliability goals for a wide range of combinational situations makes testing very costly.

The invention described employs a minimal number of materials and their associated properties in a system configuration controlled by design for tolerance to severe environments and remote interpretative electronics in a controlled environment coupled via a two conductor cable. The latter may typically be existing cabling as currently employed by "current loop" transmitters. The invention may therefore be economically applied as a modular replacement for existing systems employing greater complexities in hostile environments.

In a nuclear power plant, a reactor vessel and associated structures which comprise a nuclear steam supply system are located within a containment building. The nuclear steam supply system typically consists of several closed loops which convey hot water from the reactor vessel to steam generators for extraction of energy and then return the water to the reactor vessel for re-heating. In order to properly control and monitor the reactor's operation, it is necessary to provide instruments which measure the various process parameters of the coolant systems. The containment building, as its name implies, is provided in order to prevent fission products from escaping into the external environment in the event of an accident. Accordingly, process measurement instruments within the containment building must be impervious to extremely adverse conditions such as high radiation levels and temperature.

Because of the high temperature and radiation which might exist within the containment building during an accident pressure transducers that are normally used employ physically rugged electromechanical devices to detect displacement of a diaphragm. The transducing sensor devices normally require in excess of two conductors for operation, but are typically supported by local "current loop" signal conditioning transmitters which effectively reduce the number of conductors required for each transducer to two. During construction of a nuclear plant, pairs of conductors are installed to electrically connect the transmitters through the containment boundary to instruments within a control room, which is positioned outside the containment building. Two conductor "current loop" transmitters employ specially designed electronics which are qualification tested to assure performance under accident conditions following a normal service lifetime.

Alternatively pressure transducers are used which require three or more conductor cabling systems to remote interpretative electronics systems.

Most existing nuclear power plants in the United States employ pressure transducer systems having two conductor "current loop" transmitters. Since the amount of wiring through the containment boundary that is established at the time of plant construction is limited, and since installation of additional wiring at a later time is extremely expensive, when existing pressure transducer systems are replaced it is economically desirable to use replacements that do not require additional wiring. In view of the high cost of qualification testing it would also be desirable to use replacement systems which do not require transducer-support by electronics within the containment building, since electronics within the containment building must be designed to withstand high temperature and radiation.

SUMMARY OF THE INVENTION

Accordingly, an object of the present invention is to provide a transducer which employs a magnet that is coupled to a movable member which is displaced in response to a physical parameter.

Another object is to provide a magnetic displacement transducer which is impervious to high levels of temperature and radiation.

Another object of the present invention is to provide a magnetic displacement transducer which can be coupled to remote electrical instrumentation via only two conductors.

Another object of the present invention is to provide a magnetic displacement transducer that is employed to measure pressure or differential pressure parameters within the nuclear containment building of a nuclear power plant, with a movably mounted magnet being disposed inside a pressure boundary and with a magnet-position sensor assembly having a plurality of magnetometers being disposed outside the pressure boundary.

These and other objects can be attained by providing a transducer which employs an elongated permanent magnet that is mechanically connected to a movable member such as a pressure-responsive diaphragm. A magnet-position sensor assembly having at least one magnetometer is positioned adjacent the magnet. Each magnetometer has an elongated core of ferromagnetic material and a coil around the core, with the axis of the core and coil being perpendicular to the axis of the magnet. In order to minimize measurement errors due to slight tilt of the magnet or displacement of the magnet perpendicular to its axis, the magnet-position sensor assembly preferably includes two magnetometers that are coaxially disposed on either side of the magnet. The magnet and magnet-position sensor assembly are dimensioned to provide a repeatable response. The magnet-position sensor assembly has a pair of terminals that are connected by a single pair of twisted wires to sensing circuitry which provides a sinusoidal excitation current to the assembly, detects the second harmonic output of the assembly, and superimposes on the sinusoidal excitation current a DC biasing current to null a component of the magnet's field. The sensing circuitry also measures the resistance of the coil(s) of the assembly in order to determine the temperature at the transducer so that a temperature correction factor may be combined with the pressure measurement.

DESCRIPTION OF THE PREFERRED EMBODIMENTS

Figure 1:
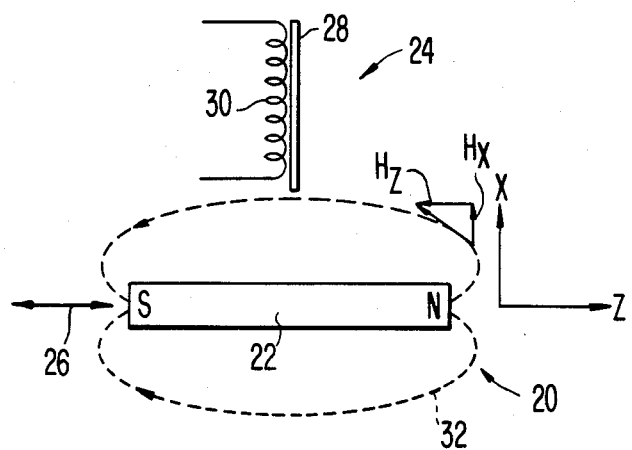
FIG. 1 schematically illustrates a simplified embodiment of a magnetic displacement transducer in accordance with the present invention, and is presented to facilitate a basic explanation of the physical principles involved.

The basic physical principles exploited by the present invention will be discussed with respect to FIG. 1, which illustrates a magnetic displacement transducer 20 having a permanent magnet 22 and a magnet-position sensor assembly in the form of a magnetometer 24. Magnet 22 is mechanically connected to a member (not illustrated) whose displacement is to be measured, and moves axially in response to this displacement as illustrated by arrow 26. Magnetometer 24 includes a core 28, consisting of a straight filament of ferromagnetic material such as permalloy, and a coil 30 wrapped around the core. The term "filament" means that core 28 has a length that is substantially greater than its cross sectional dimensions; a wire or a strip of permalloy may be used for core 28, for example, or laminated wires or strips might be employed. The axis of core 28 and coil 30 intersects the axis of magnet 22 at right angles.

With containing reference to FIG. 1, magnet 22 establishes a magnetic field that is illustrated by lines of flux 32. At each point around magnet 22, the magnetic field has a component $H_z$ that is parallel to the axis of magnet 22 and a component $H_x$ that is parallel to the axis of core 28. The relationship between these components changes as the point of interest moves from one end of the magnet to the other, and it will be intuitively apparent that the $H_x$ component is zero midway between the ends of magnet 22. Thus when magnet 22 is positioned so that its ends are equally distant from core 28, as in FIG. 1, the vertical component $H_x$ to which core 28 is exposed is zero. When magnet 22 is displaced from this central position, however, the vertical component $H_x$ at core 28 becomes non-zero, with the magnitude of the vertical component being related to the degree and direction (polarity) of displacement.

During use coil 30 receives a sinusoidal excitation current having a peak magnitude that is sufficient to saturate core 28. This saturation is symmetrical with respect to the excitation current when $H_x$ is 0 at core 28, so that core 28 is saturated during the positive half-cycles for the same length of time that it is saturated during the negative half-cycles. The symmetrical saturation induces odd harmonics of the excitation current in coil 30. When $H_x$ becomes non-zero at core 28, however, the saturation pattern becomes asymmetrical and even harmonics are also induced. The most energetic of the even harmonics is the second harmonic, which can be used as a reference in a feedback system to adjust a DC biasing current for coil 30 in order to create a DC magnetic field which offsets the vertical component $H_x$. The magnitude of this DC biasing current is proportional to the displacement of magnet 22 from its central position. Moreover, the voltage drop across coil 30 caused by the current may be used to measure the resistance of coil 30 which, in conjunction with the thermal coefficient of resistance of the wire employed for the coil, permits the temperature at coil 30 to be determined. The resistance of copper wire, for example, changes by about 4% per 10° C. rise in temperature.

Figure 2:
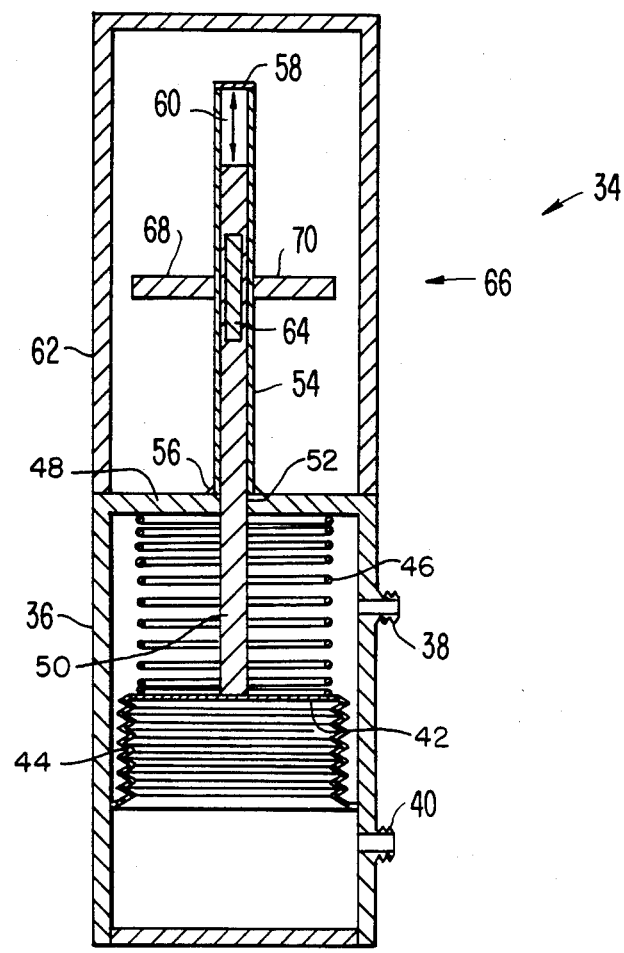
FIG. 2 is a longitudinal sectional view of a differential pressure sensor employing an embodiment of a magnetic displacement transducer of the present invention.

FIG. 2 illustrates a magnetic displacement transducer 34 that is configured as a differential pressure transducer for use in the containment building of a nuclear power plant. Transducer 34 includes a cylindrical stainless steel container 36 to which connector fittings 38 and 40 are affixed. This arrangement permits measurement of differential pressure via a member having a diaphragm portion 42 and having a bellows portion 44 which is secured to the inner walls of container 36. Spring 46 extends between end 48 of container 36 and diaphragm portion 42. Rod 50, the lower end of which is affixed to diaphragm portion 42, extends through a bore 52 in end 48. Bore 52 permits rod 50 to move in response to movement of diaphragm portion 42 but does not provide a pressure-seal, and it will be apparent that the vertical position of rod 50 is determined by the difference in pressure within the upper and lower portions of container 36. Rod 50 is slidable within tube 54, one end of which is welded at 56 to end 48 and the other end of which is closed by cap 58. Region 60 is in fluid communication with the interior of container 36; cap 58, tube 54, and container 36 form a pressure boundary.

With continuing reference to FIG. 2, cover 62 is secured to container 36 and provides magnetic shielding. Transducer 34 includes a permanent magnet 64, which is mounted in a cavity in rod 50, and a magnet-position sensor assembly 66 consisting of a pair of magnetometers 68 and 70, which are mounted on tube 54. Magnet 64 is of the rare earth-cobalt type, but other materials may alternatively be used. Its shape is cylindrical, but other elongated shapes may be used instead. An ellipsoidal shape, for example, would have the advantage of improved stability with regard to irreversible changes in magnetization as a result of temperature changes.

Figure 5:
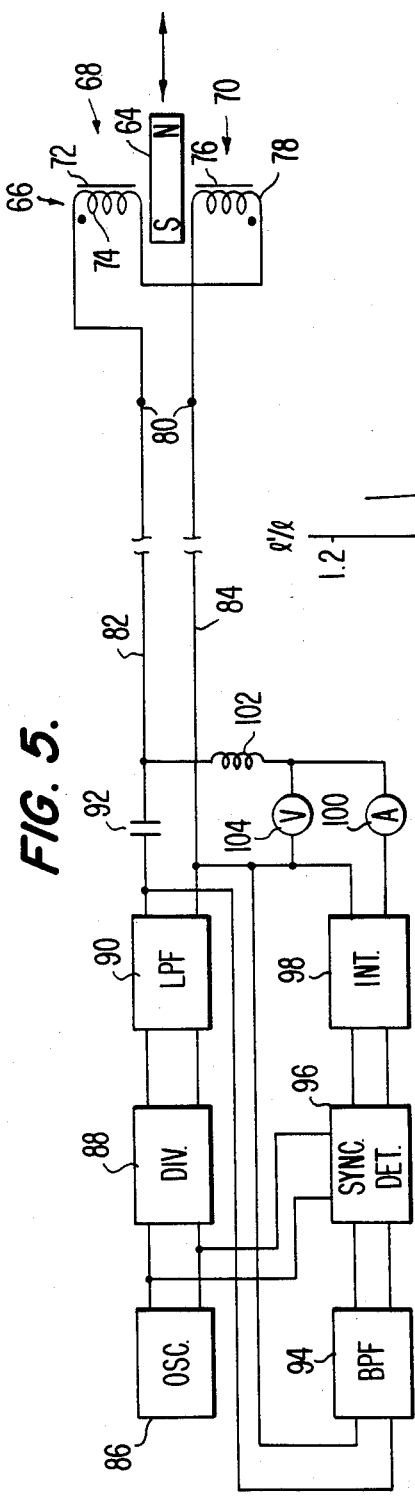
FIG. 5 is a schematic diagram of electrical circuitry connected to the magnet-position sensor assembly in FIG. 2.

Turning next to FIG. 5, magnetometer 68 of assembly 66 includes a core 72 provided by a straight ferromagnetic filament and a coil 74 wound around core 72. Similarly, magnetometer 70 includes a core 76 and a coil 78. Magnetometers 68 and 70 are arranged so that their cores 72 and 76 are coaxially disposed, with the common axis intersecting the axis of magnet 64 at right angles. It will be apparent that only the cores (72 and 76) and cover (62) are ferromagnetic.

Magnet-position sensor assembly 66 employs a plurality of symmetrically arranged magnetometers, rather than a single magnetometer as in FIG. 1, in order to achieve an improved signal-to-noise ratio and to avoid various measurement errors. As will be seen in FIG. 5, coils 74 and 78 are connected in series, between a pair of terminals 80, so that the phase of the AC magnetic field applied to magnetometer 68 is 180° from that of magnetometer 70. Thus the output of assembly 66 represents the difference in the components $H_x$ (see FIG. 1) at the two magnetometers. However, since the components $H_x$ at the positions of magnetometers 68 and 70 have opposite signs, the response of coils 74 and 76 is additive. The result is that a uniform external magnetic field will lead to no output, although the shielding afforded by cover 62 is still desirable. Furthermore, linear movement of magnet 64 at right angles to its axis, for example towards magnetometer 68 and away from magnetometer 70, will cause the $H_x$ component at magnetometer 68 to increase in magnitude, while the component $-H_x$ at magnetometer 70 decreases in magnitude by the same amount. Moreover, the effects of a tilt of magnet 64 about any axis which is minimized by tube 54, likewise largely cancel.

While magnet-position sensor assembly 66 only employs two magnetometers, 68 and 70, additional symmetrically disposed magnetometers could be used. For example, an assembly might include four magnetometers, arranged at 90° intervals around the magnet and oriented so that their axes intersect at a single point lying on the axis of the magnet.

With continuing reference to FIG. 5, typical circuitry for use with magnetic displacement transducer 34 to quantify the field produced by magnet position via servo mechanism principles will now be described. This circuitry provides a field to offset or null the field of the permanent magnet, and it is noted that suitable circuitry could be implemented in various ways. In FIG. 5, the terminals 80 of assembly 66 are connected to the circuitry via a pair of conductors 82 and 84; twisted wires work admirably.

Oscillator 86 generates a 10 KH$_z$ square wave signal which is divided by two by divider 88, which accordingly produces a 5 KH$_z$ output. Low pass filter 90 removes the harmonics and passes the fundamental, so that a 5 KH$_z$ sinusoidal excitation signal is supplied to assembly 66 via DC blocking capacitor 92. Capacitor 92 passes both the 5 KH$_z$ signal and the 10 KH$_z$ second harmonic which results when magnet 66 is displaced from its central position.

Bandpass filter 94 is tuned to 10 KH$_z$ and thus passes the second harmonic to synchronous detector 96, which also receives the 10 KH$_z$ signal from oscillator 86. The output of detector 96 is a ripple component and a DC voltage proportional to the magnitude of the second harmonic times the cosine of the phase angle between the output of bandpass filter 94 and the output of oscillator 86. Bandpass filter 94 is constructed so that this phase angle is normally near 0° or 180°. Integrator 98 eliminates the ripple component, and provides as an output a DC biasing current which flows through milliameter 100 and AC blocking choke 102 in order to null the magnetic field $H_x$ at assembly 66. Choke 102 prevents integrator 98, meter 100, and meter 104 (to be discussed later) from loading the input of the filter 94.

The reading of meter 100 represents the displacement of magnet 64 along its axis.

It will be seen that conductors 82 and 84 perform a variety of functions. They convey the sinusoidal excitation signal generated by oscillator 86, divider 88, and filter 90 to the transducer and convey the second harmonic generated by the transducer to filter 94, detector 96, and integrator 98. These latter three elements produce the DC biasing current, which is conveyed by conductors 82 and 84 back to the transducer. In short, only two conductors are needed to convey the excitation current to the transducer, the second harmonic response from the transducer, and to provide the DC biasing or "null" current to the transducer.

Although the circuitry illustrated in FIG. 5 employs the second harmonic to derive the DC biassing current, it will be apparent that other even harmonics could be used instead. Moreover odd harmonics, such as the third, are at a maximum concurrent with minimal second harmonics at null, so that the circuitry could be modified to use an odd harmonic rather than an even harmonic.

Returning to FIG. 2, transducer 34 may be exposed to high temperatures in the event of a serious accident within the containment building. While permanent magnets are commercially available that have magnetic characteristics which are virtually constant with regard to temperature changes, the same is not true for other components of the transducer. Increased temperature could result in changes in spring 46 and the response of diaphragm portion 42, so that the displacement of magnet 64 would depend, to a degree, on the ambient temperature in addition to the actual differential pressure. It has been estimated that this temperature dependence might result in as much as a 10% error in the differential pressure reading at temperatures which might be encountered within a containment building during an accident. That is, the vast temperature range to which transducer 34 might be exposed in an extreme situation results in a relatively minor but nevertheless troublesome error.

This temperature-induced error can be avoided if the temperature at transducer 34 is known, since the pressure reading provided by meter 100 can then be suitably corrected. A graph of the appropriate correction factor can be prepared for temperature correction of the reading of meter 100, for example, or correction might be automated by employing a table look-up ROM.

In FIG. 5, one terminal of high impedance volt meter 104 is connected to conductor 84 and the other terminal is connected to conductor 82 via choke 102. Since choke 102 blocks alternating current, the voltage sensed by meter 104 is equal to the DC biasing current (available from meter 100) times the DC resistance provided by choke 102, conductor 82, coils 74 and 78, and conductor 84. A substantial portion of this resistance is provided by coils 74 and 78, which can be viewed together as a temperature-sensing resistance. With a knowledge of the DC resistance of these coils at an initial temperature, the DC resistance of conductors 82 and 84 and of choke 102 at the initial temperature, and a knowledge of the thermal coefficient of resistance of the wires employed in winding coils 74 and 78, the temperature at transducer 34 can be determined based upon the readings of meters 100 and 104.

It should be noted that coils 74 and 76 can be used to find the temperature in the manner discussed above only when the DC biasing current through meter 100 is non-zero (although the AC current or power could be used, with some sacrifice in accuracy or increased complexity). If it is desired to sense the temperature when the sensor is at null position, the circuit of FIG. 5 could be changed by omitting meter 104 and by providing a switch which replaces the circuitry of FIG. 5 with an ohmmeter connected to conductors 82 and 84, so that either the differential pressure or the temperature would be alternatively available depending upon the switch setting. Regardless of the scheme employed, it will be apparent that conductors 82 and 84 permit temperature to be sensed in addition to the differential pressure.

In lieu of using the temperature coefficient of resistance of coils 74 and 78 to determine the temperature, temperature compensation for transducer 34 could be achieved by selecting a magnet 64 having a temperature coefficient of magnetization that matches and offsets the temperature-induced error of the mechanical components.

Figure 3:
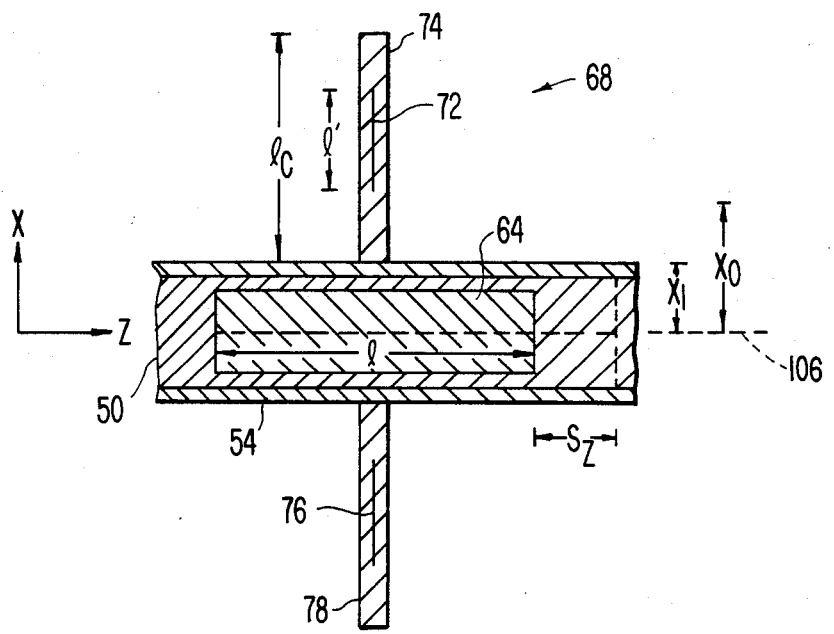
FIG. 3 is a view, partially in section, illustrating a portion of the magnetic and magnet-position sensor assembly of FIG. 2.

The magnetic field produced by the magnet in FIG. 1 was discussed in an intuitive manner, but at this point it is appropriate to provide a treatment that is more analytic. With reference to FIG. 3, for a cylindrical permanent magnet 64 having a length l and a diameter D, the magnetic field on the x-axis (that is, along cores 72 and 76) is:

$$H_z \approx \frac{-Ml(\pi D^2/4)}{(x^2 + l^2/4)^{3/2}} \qquad (1)$$

$$H_x \approx \frac{3H_z \times s_z}{(x^2 + l^2/4)} + K_3 s_z^3 \qquad (2)$$

In these expressions M is the magnetization of magnet 64, $s_z$ is the displacement of magnet 64 from its central position, and $K_3$ is a factor which will be discussed in more detail subsequently. Approximations (1) and (2) apply when the displacement $s_z$ is small compared to l/2 and when cores 72 and 76 are spaced from magnet 64 by a distance that is large compared to D/2. From approximations (1) and (2) it will be apparent that, for a linear response, the factor $K_3$ must be small. This factor averaged over the length l' is determined as follows:

$$K_3 \propto \frac{(x_o + l')^2 - l^2/6}{[(x_o + l')^2 + l^2/4]^{7/2}} - \frac{x_o^2 - l^2/6}{(x_o^2 + l^2/4)^{7/2}} \qquad (3)$$

Figure 4:
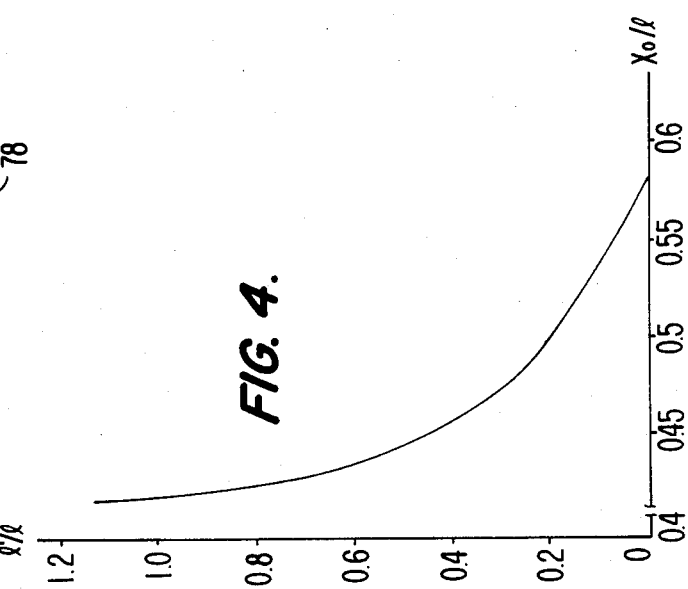
FIG. 4 is a graph illustrating the preferred relationship between various parameters illustrated in FIG. 3.

In this expression $x_o$ is the distance between the axis 106 of magnet 64 and the closest ends of cores 72 and 76, and l' is the length of each core. The factor $K_3$ can be made to vanish by choosing ratios for $x_o/l$ and $l'/l$ as given in FIG. 4. In FIG. 4 it will be noted that $l'/l$ is greater than 0.4 when $x_o/l$ is less than about 0.45; that $l'/l$ lies between 0.2 and 0.4 when $x_o/l$ is between about 0.5 and 0.45; and that $l'/l$ is less than 0.2 when $x_o/l$ is greater than about 0.5.

In addition to selecting values which eliminate $K_3$, the ratio $l_c/l'$ (where $l_c$ represents the length of coil 74 or 78) should be made as large as possible to ensure that the field produced by the coil is nearly uniform over the respective core 72 or 76. However l' cannot be made too small or the sensitivity will be low. Additionally, in order to minimize error due to possible misalignment of cores 72 and 76 with the x-axis, it is desirable for $$\frac{x_o + l'/2}{l} = 0.5 \qquad (4)$$

For each of magnetometers 68 and 70 of assembly 66, the second harmonic voltage $e_2$ is given by the following expression:

$$e_2 \approx -\frac{4N'A\mu'\omega H_x}{\pi} \times 10^{-8} \sin 2\omega t \qquad (5)$$

In expression (5) N' is the number of turns in the coil (74 or 78) linking the core, A is the cross sectional area of the core (72 or 76), and $\omega$ is $2\pi$ times the sinusoidal excitation frequency. Expression (5) applies for each of the two portions of position sensor assembly 66, so that the total second harmonic voltage provided by assembly 66 is twice that set forth in expression (5). From expression (5) it will be apparent that, in order to increase the signal-to-noise ratio and minimize the effect of possible stray external magnetic fields, it is desirable to provide a relatively large value of $H_x$. As a competing consideration, however, this value should not be so large that significant coil heating occurs when the field is nullified by the DC biasing current.

The following example employs the foregoing considerations to ascertain suitable dimensions for magnetic displacement transducer 34. Assume that the maximum displacement (that is, maximum $s_z$) is to be 0.075 inches (0.191 cm), that a magnet having a diameter D of 3/16 inches (0.476 cm) is to be used, and that the coils 74 and 78 are mounted so that the distance $X_1$, between the axis 106 of the magnet and the closest end of either coil, is 0.23 inches (0.584 cm). Referring to FIG. 4, a convenient value to choose for $X_o/l$ is 0.5, which leads to the value 0.186 for $l'/l$ (when expression (3) is solved, with $K_3$ set to zero). Selecting the ratio $l_c/l' = 3$ as a compromise, and recognizing that $X_o = X_1 + (l_c - l')/2$ because of the geometry, one obtains l' = 0.136 inches (0.345 cm), l = 0.73 inches (1.85 cm), $l_c = 0.41$ inches (1.04 cm), and $X_o = 0.367$ inches (0.93 cm). With these values it should be noted that the ratio $(X_o + l'/2)/l = 0.59$, which is not far from the optimum value set forth in Equation 4.

A typical value for the magnetization M of a rare earth-cobalt magnet with a low temperature coefficient is 422 emu ($4.22 \times 10^{-1}$ in the MKS system). The resulting magnetic field, when used with a position sensor assembly 66 having coils 74 and 78 of 170 effective turns and cores 72 and 76 with cross sectional areas of $5.8 \times 10^{-6}$ square inches ($3.74 \times 10^{-5}$ cm$^2$), results in a maximum second harmonic voltage of about 60 microvolts (30 microvolts for each of magnetometers 68 and 70) when the displacement $s_z$ is only a thousandth of its maximum value. Accordingly, it will be apparent that even small displacements can be readily and accurately detected.

It will be understood that the above description of the present invention is susceptible to various modifications, changes, and design adaptations to sense position and parameters which may be made related to position over a wide range, and that the same are intended to be comprehended within the meaning and range of equivalence of the appended claims.

We claim:

1. A magnetic displacement transducer system for measuring the position of a movable member that is exposed to a fluid, comprising:
   an elongated permanent magnet having an axis;
   means connecting said magnet and the movable member for moving said magnet along its axis in response to movement of the member, said means including a rod having one end thereof operationally connected to said member, said magnet being mounted on said rod;
   a tube having one end that is closed and another end that is exposed to the fluid, said magnet and a portion of said rod being slidably disposed in said tube through the end thereof that is exposed to the fluid;
   an electrically operated magnet-position sensor assembly with a pair of terminals which convey all electrical current flowing though the assembly and with at least one magnetometer adjacent said magnet to sense the position thereof, each said at least one magnetometer being electrically connected to said terminals and including an elongated ferromagnetic core having an axis and a coil around the core, the axis of the core of each said at least one magnetometer being disposed at substantially right angles to the axis of said magnet, said magnet position sensor assembly being mounted outside said tube so that it is not exposed to the fluid; and
   means connected to said terminals for conveying a sinusoidal excitation current to said at least one coil to drive said at least one core into saturation, for conveying even harmonics from said at least one coil in response to assymetrical saturation of said at least one core, and for conveying a DC biassing current to null the component of the permanent magnet's field that lies along the axis of said at least one core, the magnitude of the biassing current corresponding to the relative position of said magnet.

2. The system of claim 1, wherein said magnet-position sensor assembly comprises a plurality of magnetometers that are symmetrically disposed about said magnet, the coils of said magnetometers being series-connected between said terminals.

3. The system of claim 2, wherein said magnet-position sensor assembly has two magnetometers, the cores of which are substantially co-axially disposed.

4. The system of claim 3, further comprising means connected to said terminals for measuring the temperature of said coils.

5. The system of claim 3, wherein said movable member comprises a diaphragm that is responsive to the pressure of the fluid.

6. The system of claim 5, wherein said permanent magnet has a diameter of substantially 0.48 cm and a length of substantially 1.91 cm, wherein each core has a length of substantially 0.35 cm, and wherein the distance between the axis of said magnet and the end of each core that is closest thereto is substantially 0.93 cm.

7. The system of claim 1, further comprising means connected to said terminals for measuring the temperature of said at least one coil.

8. The system of claim 7, wherein said magnet is cylindrical and wherein $l'/l$ is greater than 0.4 and $x_o/l$ is less than about 0.45, where $l'$ is the length of said at least one core, $l$ is the length of said magnet, and $x_o$ is the distance between the axis of said magnet and the closest end thereto of said at least one core.

9. The system of claim 7, wherein said magnet is cylindrical, and wherein $l'/l$ is between 0.4 and 0.2 and wherein $x_o/l$ is between about 0.45 and about 0.5, where $l'$ is the length of said at least one core, $l$ is the length of said magnet, and $x_o$ is the distance between the axis of said magnet and the closest end thereto of said at least one core.

10. The system of claim 7, wherein said magnet is cylindrical and wherein $l'/l$ is less than 0.2 and $x_o/l$ is greater than about 0.5, wherein $l'$ is the length of said at least one core, $l$ is the length of said magnet, and $x_o$ is the distance between the axis of said magnet and the closest end thereto of said at least one core.

11. The system of claim 1, where said magnet is cylindrical, and wherein $l'/l$ is greater than 0.4 and $x_o/l$ is less than about 0.45, where $l'$ is the length of said at least one core, $l$ is the length of said magnet, and $x_o$ is the distance between the axis of said magnet and the closest end thereto of said at least one core.

12. The system of claim 1, wherein said magnet is cylindrical, wherein $l'/l$ is between 0.4 and 0.2, and wherein $x_o/l$ is between about 0.45 and about 0.5, where $l'$ is the length of said at least one core, $l$ is the length of said magnet, and $x_o$ is the distance between the axis of said magnet and the closest end thereto of said at least one core.

13. The system of claim 1, wherein said magnet is cylindrical, and wherein $l'/l$ is less than 0.2 and $x_o/l$ is greater than about 0.5, where $l'$ is the length of said at least one core, $l$ is the length of said magnet, and $x_o$ is the distance between the axis of said magnet and the closest end thereto of said at least one core.

14. The system of claim 1, wherein said movable member is a diaphragm in a differential pressure transducer that is exposed to a wide range of temperatures, the displacement of said diaphragm being a function of both the differential pressure and the temperature, and wherein the magnetization M of said magnet has a temperature coefficient that is selected to compensate for the temperature dependence of said differential pressure transducer.

* * * * *